(12) United States Patent
Tuliani

(10) Patent No.: US 10,666,602 B2
(45) Date of Patent: May 26, 2020

(54) EDGE CACHING IN EDGE-ORIGIN DNS

(71) Applicant: Microsoft Technology Licensing, LLC, Redmond, WA (US)

(72) Inventor: Jonathan Roshan Tuliani, Mount Merrion (IE)

(73) Assignee: Microsoft Technology Licensing, LLC, Redmond, WA (US)

(*) Notice: Subject to any disclaimer, the term of this patent is extended or adjusted under 35 U.S.C. 154(b) by 244 days.

(21) Appl. No.: 15/588,120

(22) Filed: May 5, 2017

(65) Prior Publication Data

US 2018/0324137 A1  Nov. 8, 2018

(51) Int. Cl.
| | |
|---|---|
| *H04L 29/12* | (2006.01) |
| *H04L 29/06* | (2006.01) |
| *H04L 29/08* | (2006.01) |

(52) U.S. Cl.
CPC ...... *H04L 61/1511* (2013.01); *H04L 61/6009* (2013.01); *H04L 67/2842* (2013.01); *H04L 67/42* (2013.01)

(58) Field of Classification Search
CPC ......... H04L 29/06027; H04L 29/12066; H04L 63/0281; H04L 67/28; H04L 29/12122; H04L 61/1511; H04L 67/2842; H04L 61/6009; H04L 67/42
See application file for complete search history.

(56) References Cited

U.S. PATENT DOCUMENTS

| | | | |
|---|---|---|---|
| 6,826,626 B1 * | 11/2004 | McManus | G06F 16/9574 709/246 |
| 6,976,090 B2 | 12/2005 | Ben-Shaul et al. | |
| 7,372,809 B2 | 5/2008 | Chen et al. | |
| 7,437,482 B2 | 10/2008 | Jungck | |

(Continued)

FOREIGN PATENT DOCUMENTS

| | | |
|---|---|---|
| CN | 102577303 A | 7/2012 |
| CN | 105119906 A | 12/2015 |

(Continued)

OTHER PUBLICATIONS

Ferretti, et al., "Mitigation of Random Query String DoS via Gossip", In Proceedings of the Computing Research Repository, Sep. 2011, pp. 1-5.

(Continued)

*Primary Examiner* — Kyung H Shin

(74) *Attorney, Agent, or Firm* — Ray Quinney & Nebeker, P.C.; Thomas M. Hardman; Sunah K. Lee

(57) ABSTRACT

In one example, an edge server including a processor, memory, and a domain name system (DNS) edge application stored in the memory and executed by the processor is provided. The DNS edge application is configured to: receive a first DNS query requesting a first DNS record; forward the first DNS query to an origin server; receive a response to the first DNS query from the origin server; store the response on the edge server; receive a second DNS query requesting a second DNS record; determine that the second DNS record is not stored on the edge server; and generate a (Continued)

new response to the second DNS query based on the stored response. The first DNS query and the second DNS query may be the same DNS query, and the second DNS query is not forwarded to the origin server.

20 Claims, 8 Drawing Sheets

(56) References Cited

U.S. PATENT DOCUMENTS

| | | | |
|---|---|---|---|
| 7,761,570 | B1 | 7/2010 | Halley |
| 7,970,939 | B1 | 6/2011 | Satish et al. |
| 8,117,296 | B2 | 2/2012 | Liu et al. |
| 8,468,222 | B2 | 6/2013 | Sakata et al. |
| 8,612,550 | B2 | 12/2013 | Yoo et al. |
| 2003/0172183 | A1 | 9/2003 | Anderson et al. |
| 2004/0205162 | A1* | 10/2004 | Parikh ............... H04L 29/06027 709/219 |
| 2005/0262238 | A1 | 11/2005 | Reeves et al. |
| 2006/0112176 | A1 | 5/2006 | Liu |
| 2008/0189437 | A1 | 8/2008 | Halley |
| 2008/0294795 | A1 | 11/2008 | Banerjee et al. |
| 2009/0172138 | A1* | 7/2009 | Wang ................ H04L 29/12066 709/223 |
| 2010/0332680 | A1 | 12/2010 | Anderson et al. |
| 2012/0023090 | A1* | 1/2012 | Holloway ............... H04L 67/28 707/709 |
| 2012/0110148 | A1 | 5/2012 | Liu et al. |
| 2013/0198269 | A1 | 8/2013 | Fleischman et al. |
| 2013/0346746 | A1 | 12/2013 | Ghosh |
| 2014/0258446 | A1 | 9/2014 | Bursell |
| 2015/0058488 | A1* | 2/2015 | Backholm ........... H04L 61/1511 709/226 |
| 2016/0028847 | A1 | 1/2016 | Bradshaw et al. |
| 2016/0080262 | A1 | 3/2016 | Crasta et al. |

FOREIGN PATENT DOCUMENTS

| | | |
|---|---|---|
| CN | 105491179 A | 4/2016 |
| WO | 2013189024 A1 | 12/2013 |

OTHER PUBLICATIONS

"Financial Services Firms Defend Against Distributed Denial of Service Attacks and Data Breaches While Maintaining High Performance and Availability", https://www.akamai.com/it/it/multimedia/documents/case-study/financial-firms-defend-against-ddos-case-study.pdf, Published on: Feb. 2015, 2 pages.

"Enhanced DNS", Retrieved From: http://web.archive.org/web/20140122223743/http://www.akamai.com/dl/brochures/Product_Brief_Terra_eDNS.pdf, Jan. 22, 2014, 2 Pages.

"Non Final Office Action Issued in U.S. Appl. No. 14/339,097", dated Nov. 2, 2016, 21 pages.

Abley, et al., "A Mechanism for Remote-Triggered DNS Cache Flushes (DNS Flush)", In Internet Engineering Task Force,Standard Working Draft, Internet Society, Jun. 24, 2013, 12 Pages.

Mockapetris, P., "Domain Names—Concepts and Facilities", In Internet Engineering Task Force, Network Working Group, Nov. 1987, 56 Pages.

"International Search Report & Written Opinion Issued in PCT Application No. PCT/US2015/041050", dated Jan. 15, 2016, 16 Pages.

Su, et al., "Drafting Behind Akamai (Travelocity-Based Detouring)", In Proceedings of the Conference on Applications, Technologies, Architectures, and Protocols for Computer Communications, Sep. 11, 2006, 12 Pages.

Work, Dan, "Challenges and Opportunities in Deploying DNSSEC—A Progress Report on an Investigation into DNSSEC Deployment", In Whitepaper of Securing and Trusting Internet Names, Mar. 23, 2012, 7 Pages.

* cited by examiner

EDGE CACHING IN EDGE-ORIGIN DNS

FIELD

The present disclosure relates to systems and methods for hardening a domain name system (DNS) against distributed denial-of-service (DDoS) type attacks.

BACKGROUND

The Domain Name System (DNS) is sometimes called the "phone book" of the Internet. It maps the names used by humans (e.g., www.microsoft.com) to IP addresses used by computers (e.g., 23.195.11.179). One challenge facing Internet-facing DNS systems is the threat of a large-scale DDoS attack. A DDoS attack is an attempt to make a service (e.g., a website) unavailable by bombarding one or more servers with more traffic than the server(s) can handle.

An Edge-Origin DNS architecture is based on an architecture commonly used for content delivery networks (CDNs). It uses a set of Internet-facing DNS servers (the Edge), which answer DNS queries using data from a local cache. This is connected to a back-end set of DNS servers (the Origin) containing all DNS records. When a query is received at the Edge, the Edge first checks to see if its cache already contains the necessary response. If so, the response is returned. If not, the Edge calls the Origin to retrieve the necessary DNS records, caches them, and returns the response. One advantage of an Edge-Origin architecture is that it separates query scale (handled by the Edge) from number-of-records scale (handled by the Origin).

In an Edge-Origin DNS architecture, negative responses (i.e., responses where the name in the query does not match an existing record) and wildcard DNS records are not cached at the Edge. Accordingly, queries calling for a negative response or wildcard DNS record are passed to the Origin, potentially overloading the Origin.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In a feature, an edge server is provided. The edge server may include a processor, memory, and a DNS edge application that is stored in the memory and executed by the processor. The DNS edge application may be configured to receive a first DNS query requesting a first DNS record. If the first DNS record is not stored on the edge server, the DNS edge application may forward the first DNS query to an origin server. The DNS edge application may receive a response to the first DNS query from the origin server, and store the response on the edge server to provide a stored response. The DNS edge application may further receive a second DNS query requesting a second DNS record and determine that the second DNS record is not stored on the edge server. The DNS edge application may generate a new response to the second DNS query based on the stored response. The first DNS query and the second DNS query may include the same DNS query. Further, the second DNS query is not forwarded to the origin server.

In a feature, the first DNS query may identify the first DNS record by a record name and a record type. Further, the response to the first DNS query from the origin server may include a 'no data' response indicating that the origin server has stored thereon one or more DNS records matching the record name, but does not have stored thereon any DNS records matching both the record name and record type. In one example of the foregoing feature, the new response to the second DNS query may include the 'no data' response.

In another feature, the first DNS query may identify the first DNS record by a DNS zone and a record name. Further, the response to the first DNS query from the origin server may include a negative range response indicating (i) that the origin server hosts the DNS zone and (ii) a range of DNS record names, encompassing the record name, corresponding to DNS records that are not stored on the origin server. In one example of the foregoing feature, the new response to the second DNS query includes a NXDOMAIN response based on the negative range response.

In one feature, the first DNS query may identify the first DNS record by a DNS zone. Further, the response to the first DNS query from the origin server may include a negative range response indicating a range of DNS zones, encompassing the DNS zone, corresponding to DNS records that are not hosted by the origin server. In one example of the foregoing feature, the new response to the second DNS query may include a REFUSED response based on the negative range response.

In a feature, the first DNS query may match a wildcard record stored on the origin server. Further, the response to the first DNS query from the origin server may include the wildcard record. In one example of the foregoing feature, the new response to the second DNS query may be based on the wildcard record.

In one feature, a method of responding to DNS queries from an origin server is provided. The method may include receiving a DNS query requesting a DNS record if the DNS record is not stored on an edge server, wherein the DNS query identifies the DNS record by a DNS zone, a record name, and a record type. The method may further include determining whether an origin server hosts the DNS zone, determining whether the origin server has one or more DNS records stored thereon matching the record name, and determining whether the origin server has one or more DNS records stored thereon matching the record type. If the origin server hosts the DNS zone, but does not have stored thereon one or more DNS records matching the record name or the record type, the method may further include generating a negative range response based on the record name indicating a range of DNS record names, encompassing the record name, corresponding to DNS records that are not stored on the origin server. In addition, any wildcard records stored on the origin server corresponding to the negative range response may be identified. The negative range response and wildcard records may be transmitted for storage on the edge server.

In one feature, the method further includes transmitting, for storage on the edge server, a REFUSED response if the origin server does not host the DNS zone.

In another feature, the method further includes transmitting, for storage on the edge server, the one or more DNS records matching the record name and the record type if the origin server has one or more DNS records stored thereon matching the record name and the record type.

In a feature, the method further includes transmitting, for storage on the edge server, a 'no data' response if the origin server has one or more DNS records stored thereon matching the record name, but not matching the record type.

In a feature, a system including a processor, memory, and a DNS edge application stored in the memory and executed by the processor is provided. The DNS edge application may be configured to receive DNS query requesting a DNS record, wherein the DNS query identifies the DNS record by a DNS zone, a record name, and a record type. The DNS edge application may be further configured to determine whether the DNS record corresponds to a first negative range response stored on the edge server based on the DNS zone, where the first negative range response indicates a range of DNS zones that are not hosted by an origin server associated with the edge server. The DNS edge application may be further configured to determine whether the DNS record corresponds to a 'no data' response stored on the edge server based on the record name and record type, where the 'no data' response indicates that the origin server has stored thereon one or more DNS records matching the record name, but does not have stored thereon any DNS records matching both the record name and record type. The DNS edge application may be further configured to determine whether the DNS record corresponds to a second negative range response stored on the edge server based on the record name. The DNS edge application may be further configured to determine whether the DNS query matches a wildcard record stored on the edge server if the DNS record corresponds to the second negative range response. If the DNS query matches the wildcard record, the DNS edge application may be further configured to determine whether any records stored on the edge server include a closer match to the record name than the wildcard record. The DNS edge application may be further configured to generate at least one of the following responses to the DNS query without forwarding the DNS query to the origin server: a REFUSED response, a 'no data' response, a NXDOMAIN response, and a response based on the wildcard record.

In one feature, the DNS edge application is further configured to generate a REFUSED response if the DNS record corresponds to the first negative range response.

In another feature, the DNS edge application is further configured to generate a 'no data' response if the DNS record corresponds to the 'no data' response stored on the edge server.

In still another feature, the DNS edge application is further configured to generate a NXDOMAIN response if the DNS query does not match the wildcard record stored on the edge server.

In yet another feature, the DNS edge application is further configured to generate a 'no data' response if one or more records stored on the edge server include the closer match to the record name than the wildcard record.

In a feature, the DNS edge application is further configured to generate a response based on the wildcard record if no records stored on the edge server include the closer match to the record name than the wildcard record.

In one feature, the DNS edge application is further configured to receive a third negative range response from the origin server if the DNS record does not correspond to the second negative range response stored on the edge server.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 1:
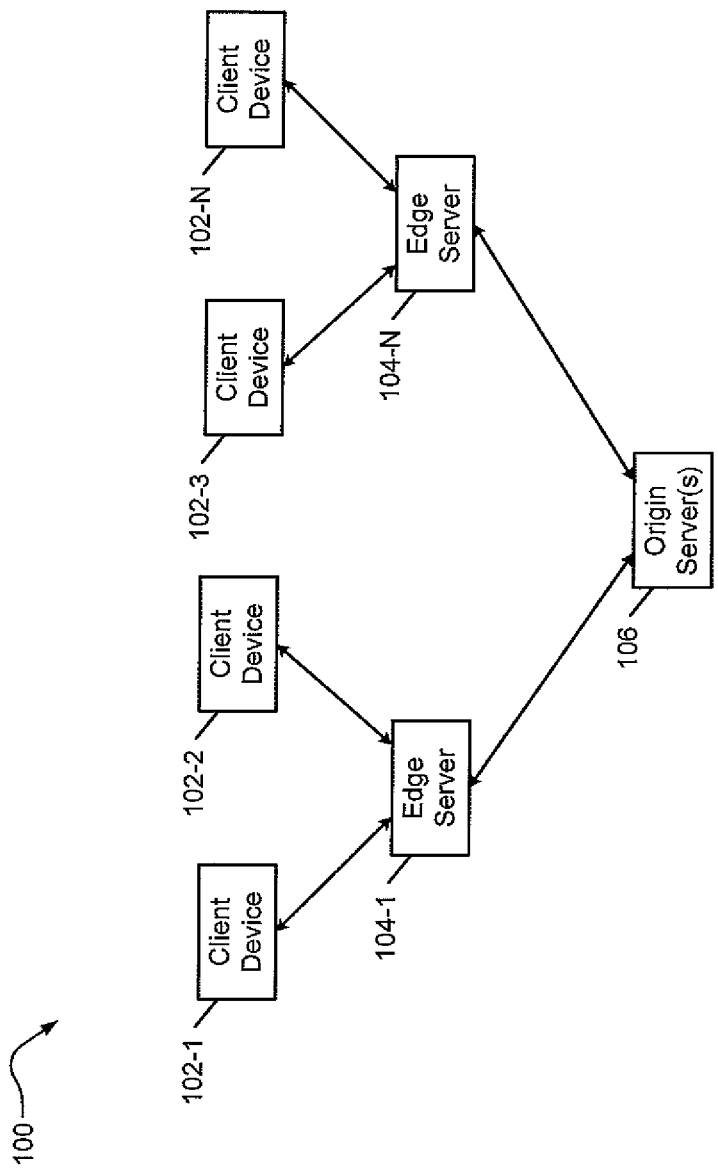
FIG. 1 is a functional block diagram of a DNS system according to principles of the present disclosure.

FIG. 1 shows a simplified example of a distributed computing system 100. The distributed computing system 100 includes one or more client devices 102-1, 102-2, 102-3, . . . , and 102-N (collectively, client devices 102), one or more edge servers 104-1 . . . 104-N (collectively, edge servers 104), and one or more origin servers 106. N and M are integers greater than or equal to one. The client devices 102, edge servers 104, and origin server(s) 106 communicate with each other via a distributed communications system. The client devices 102, edge servers 104, and origin server(s) 106 connect to the distributed communications system using wireless and/or wired connections. The distributed communications system may include a local area network (LAN), a wide area network (WAN) such as the Internet, or other type of network.

The client devices 102 may include smartphones, personal digital assistants (PDAs), laptop computers, personal computers (PCs), and any other Internet-enabled device. The edge serves 104 and origin server(s) 106 may provide multiple services to the client devices 102. For example, the servers 104, 106 may execute software applications developed by one or more vendors. The servers 104, 106 may host multiple databases that are relied on by the software applications in providing services to the client devices 102.

In some examples, an edge server (e.g., edge server 104-1) executes a DNS edge application configured to respond to DNS queries without forwarding queries along to the origin server(s) 106 as discussed in additional with regard to FIGS. 4-5 and 7 below. Similarly, in some examples, the origin server(s) 106 executes a DNS origin application configured to respond to DNS queries forwarded to the origin server(s) 106 from an edge server (e.g., edge server 104-1) as discussed in additional detail with regard to FIGS. 4 and 6 below.

The distributed computing system 100 of FIG. 1 illustrates an "Edge-Origin" architecture that may operate as follows. Origin server(s) 106 are placed at a relatively small number of global locations (e.g., five locations). The origin server(s) 106 are the authoritative source of all DNS records, and the locations at which changes to DNS records are managed. However, the origin servers 106 are typically not directly accessible to client devices 102. The edge servers 104 are placed at a relatively large number of global locations (e.g., fifty locations), close to client devices 102 so as to minimize network latency.

The edge servers 104 may include a cache of the most recently-used DNS records. Client device requests for DNS records are directed to the nearest edge server (e.g., edger server 104-1). Although the client devices 102 are shown as being in direct connection with the edge servers 104, those having ordinary skill in the art will appreciate that the client devices 102 may communicate with the edge servers 104 (e.g., by transmitting queries) via one or more intermediary computing devices. For example, queries from client devices 102 may be transmitted through a recursive/caching DNS service hosted by an enterprise, ISP, etc. before ultimately being received by the edge servers 104. The edge server checks to see if the requested DNS record is already cached; if so the cached DNS record is returned. Otherwise, the edge server retrieves the DNS record from the closest available origin server 106, caches it for future requests, and the DNS record is returned. DNS records stored at the edge servers may be cleared from the edge servers 104 respective caches due to, for example, age and/or to make space for more commonly-requested DNS records. In some examples, DNS records may be actively purged from the edge servers' caches to enable faster response times.

In one example, the distributed computing system 100 constitutes an authoritative, Internet-facing DNS service, adopting an Edge-Origin architecture. The origin server(s) 106 host all DNS zones. The Edge servers 104 receive DNS queries from client devices 102, and respond to those queries either from their local cache or by querying the closest available origin server 106. From an external perspective, only the edge servers 104 are visible to the client devices 102, and these are seen as being the authoritative DNS servers for each DNS zone.

Figure 2:
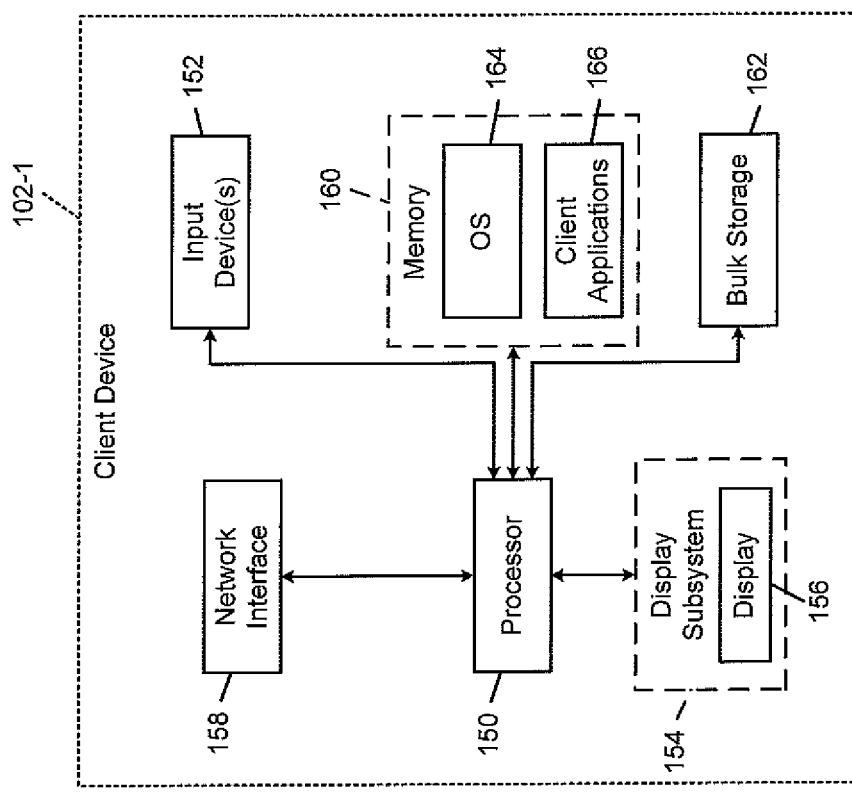
FIG. 2 is a functional block diagram of a client device according to principles of the present disclosure.

Turning now to FIG. 2, one example of a client device 102-1 is provided. The client device 102-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 102-1 to the distributed computing system. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 102-1 executes an operating system (OS) 164 and one or more client applications 166. The client applications 166 include an application that accesses the edge servers 104 via the distributed communications system. In one example, the client applications 166 may include a web browser capable of accessing the edge servers 104 via the distributed communications system.

Figure 3A:
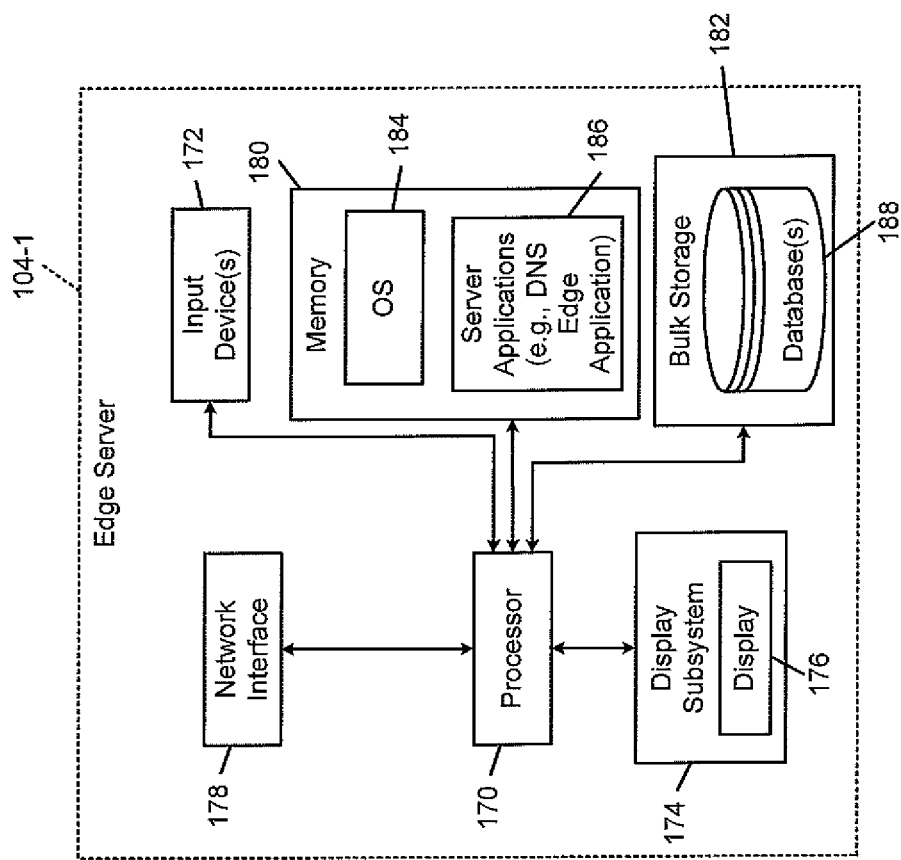
FIG. 3a is a functional block diagram of an edge server according to principles of the present disclosure.

Turning now to FIG. 3a, one example of an edge server 104-1 is provided. The edge server 104-1 typically includes one or more CPUs or processors 170, a network interface 178, memory 180, and bulk storage 182. In some implementations, the edge server 104-1 may be a general-purpose server and include one or more input devices 172 (e.g., a keypad, touchpad, mouse, and so on) and a display subsystem 174 including a display 176.

The network interface 178 connects the edge server 104-1 to the distributed communications system. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the edge server 104-1 executes an operating system (OS) 184 and one or more server applications 186, which may be housed in a virtual machine hypervisor or containerized architecture, which may include the DNS edge application. The bulk storage 182 may store one or more databases 188 that store data structures used by the server applications 186 to perform respective functions.

Figure 3B:
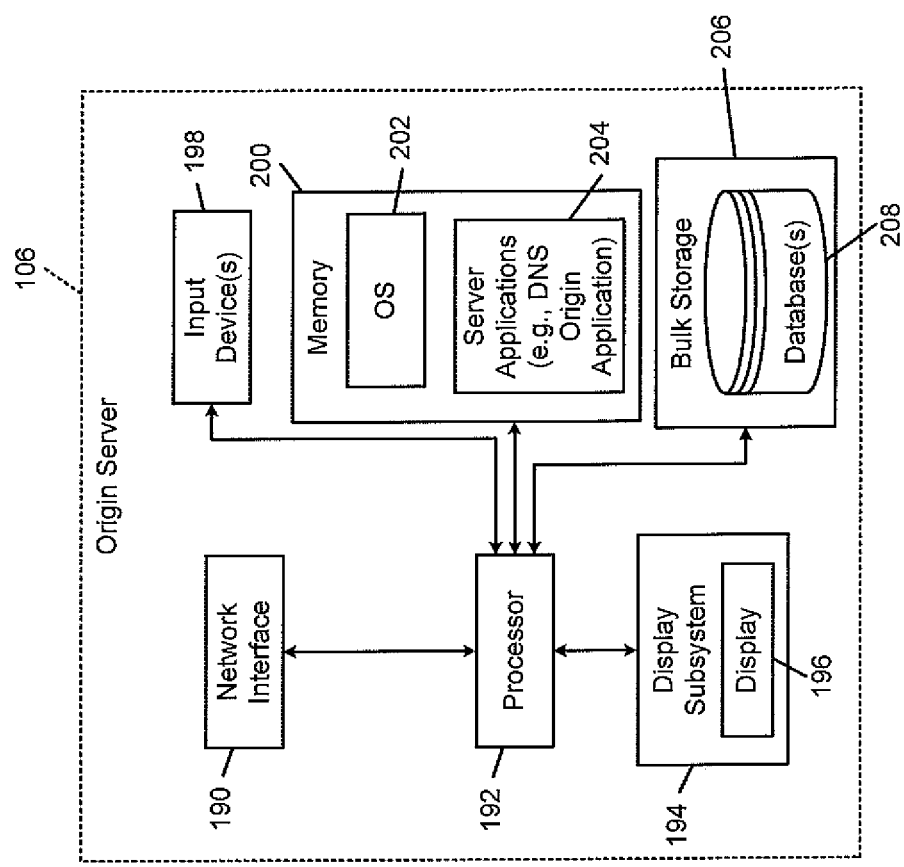
FIG. 3b is a functional block diagram of an origin server according to principles of the present disclosure.

Turning now to FIG. 3b, one example of an origin server 106 is provided. The origin server 106 typically includes one or more CPUs or processors 192, a network interface 190, memory 200, and bulk storage 206. In some implementations, the origin server 106 may be a general-purpose server and include one or more input devices 198 (e.g., a keypad, touchpad, mouse, and so on) and a display subsystem 194 including a display 196.

The network interface 190 connects the origin server 106 to the distributed communications system. For example, the network interface 190 may include a wired interface (e.g., an Ethernet interface) and/or a wireless interface (e.g., a Wi-Fi, Bluetooth, near field communication (NFC), or other wireless interface). The memory 200 may include volatile or nonvolatile memory, cache, or other type of memory. The bulk storage 206 may include flash memory, one or more magnetic hard disk drives (HDDs), or other bulk storage devices.

The processor 192 of the origin server 106 executes an operating system (OS) 202 and one or more server applications 204, which may be housed in a virtual machine hypervisor or containerized architecture, which may include the DNS origin application. The bulk storage 206 may store one or more databases 208 that store data structures used by the server applications 204 to perform respective functions.

Figure 4:
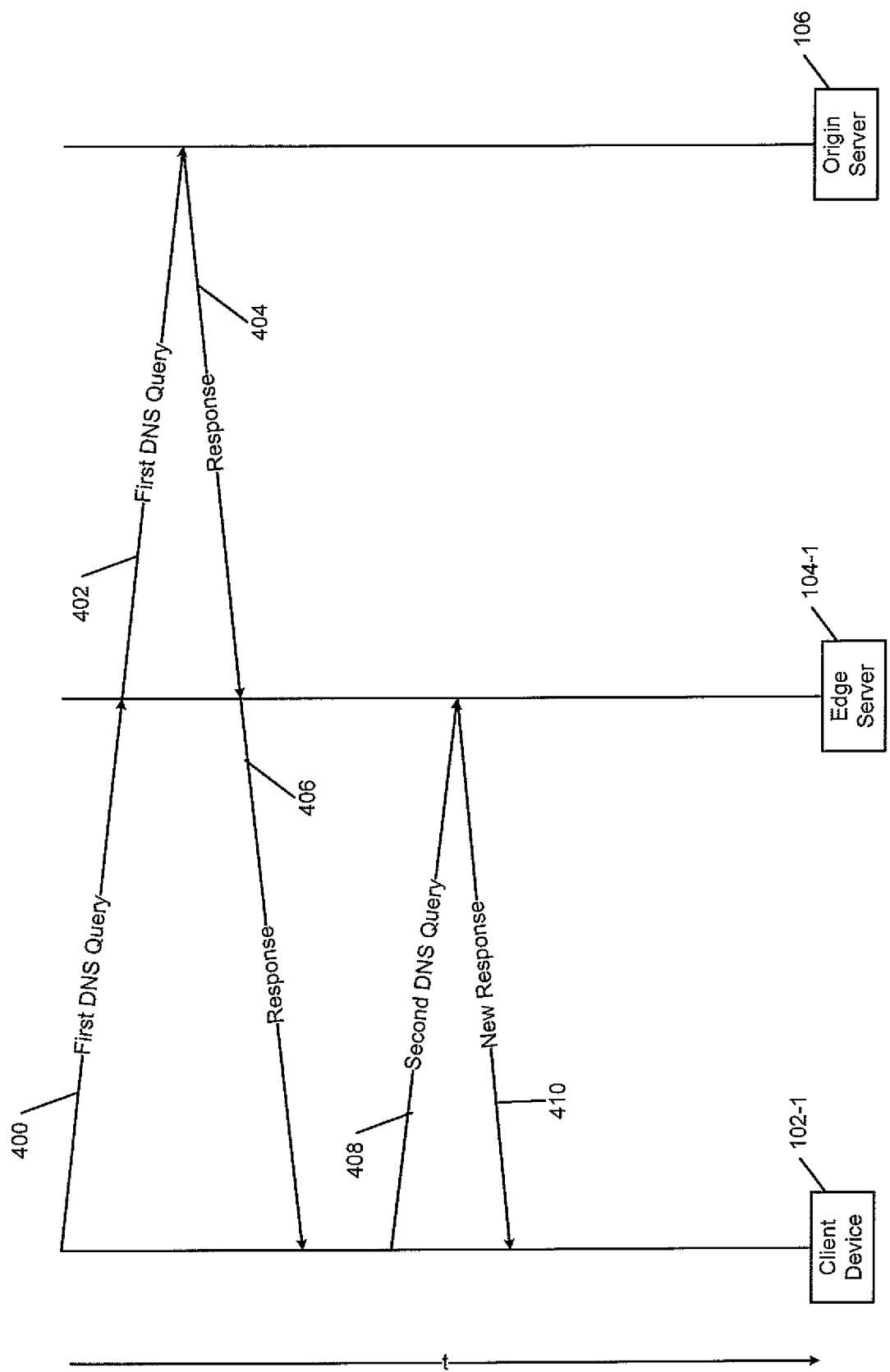
FIG. 4 is a diagram illustrating a communications protocol according to principles of the present disclosure.

Referring now to FIG. 4, a communications protocol between an example client device 102-1, edge server 104-1, and origin server 106 is illustrated according to principles of the present disclosure over a period of time (t). More specifically, FIG. 4 illustrates a communication protocol by which the edge server 104-1 can populate its storage (e.g., its cache) with DNS query responses so that when a previously received DNS query is received again, the edge server 104-1 can respond to the query without having to forward the query to the origin server 106. In this manner, the number of DNS queries received by the origin server 106 may be significantly reduced, thereby hardening the system against a DDoS type attack.

At 400, a first DNS query is transmitted from the client device 102-1 to the edge server 104-1. Although the client device 102-1 is shown directly communicating with the edge server 104-1, those having ordinary skill in the art will appreciate that the client device 102-1 may communicate with the edge server 104-1 (e.g., by transmitting the first DNS query 400) via one or more intermediary computing devices. For example, the first DNS query 400 from client device 102-1 may be transmitted through a recursive/caching DNS service hosted by an enterprise, ISP, etc. before ultimately being received by the edge server 104-1. The first DNS query may request a first DNS record, and may identify the requested first DNS record by specifying a fully qualified domain name (e.g., www.example.com) indicating a DNS zone, record name, and, in some instances, record type. The edge server 104-1 is configured to receive the first DNS query. Following reception of the first DNS query, the edge server 104-1 may determine whether the requested first DNS record is stored on the edge server 104-1. If so, the edge server may respond to the first DNS query by supplying the client device 102-1 with the requested first DNS record.

At 402, upon a determination by the edge server 104-1 that the edge server 104-1 does not have the requested first DNS record stored thereon, the edge server 104-1 may forward the first DNS query to the origin server 106.

At 404, the origin server 106 may transmit a response to the edge server 104-1. The response may take a variety of different forms based on the nature of the first DNS query. The edge server 104-1 may store the response locally (e.g., in its cache) to provide a stored response. As used herein, storing the response may include (i) storing a complete response or (ii) storing data necessary to construct (i.e., synthesize) a complete response at the edge server 104-1.

As noted above, the response may take a variety of different forms depending on the nature of the first DNS query. In one example—where the origin server 106 has the requested first DNS record stored thereon—the response may include the requested first DNS record.

In another example, the response may include a 'no data' response. As used herein, a 'no data' response indicates that the origin server 106 has stored thereon one or more DNS records that match the record name specified in the DNS query (e.g., the first DNS query), but no DNS records stored thereon matching both the record name and record type specified in the DNS query.

In one example, the response may include a NXDOMAIN response. A NXDOMAIN response is a DNS response indicating that the origin server 106 hosts the DNS zone specified in the DNS query, but does not include any DNS records (aside from any Statement of Authority (SOA) record(s) matching the zone name) within that zone matching the record name specified in the DNS query.

In still another example, the response may include a REFUSED response. A REFUSED response is a DNS response indicating that the origin server 106 does not host the zone specified in the DNS query.

In one example, the response may include a wildcard record. A wildcard record is a DNS record that matches requests for non-existent domain names. A wildcard record is specified by using a "*" as the leftmost label of a domain name. The rules governing when a wild card will match a DNS query are specified in RFC 1034, which is hereby incorporated by reference in its entirety.

In still another example, the response may include a first type of negative range response. In certain examples, the first type of negative range response is referred to as a $NRR_{RF}$. The first type of negative range response indicates a range of DNS zones, encompassing the DNS zone specified in the DNS query, corresponding to DNS zones (and DNS records by extension) that are not hosted by the origin server 106. More specifically, the first type of negative range response indicates a range of DNS zones that are not hosted by the origin server 106 by listing DNS zones that do exist on either side of the non-existent DNS zone specified in the DNS query based on an ordered listing of DNS zones. In some examples, the ordered listing could be alphabetical, numerical, or any other suitable ordering convention known to those having ordinary skill in the art.

In another example, the response may include a second type of negative range response. In certain examples, the second type of negative range response is referred to as a $NRR_{NX}$. The second type of negative range response indicates (i) that the origin server 106 hosts the DNS zone specified in the DNS query and (ii) a range of DNS record names, encompassing the record name specified in the DNS query, corresponding to DNS records that are not stored on the origin server 106. More specifically, the second type of negative range response indicates a range of DNS records that are not stored on the origin server 106 by listing record names of DNS records that do exist on either side of the non-existent record name specified in the DNS query based on an ordered listing of DNS records in DNS record zones. In some examples, the ordered listing could be alphabetical, numerical, or any other suitable ordering convention known to those having ordinary skill in the art.

The second type of negative range response is clarified by way of the following non-limiting example. Consider a DNS zone 'com', with DNS records 'a.com', 'b.com', 'e.com' and 'g.com' (the DNS record type is irrelevant). This zone is hosted by the origin server 106 and queries are received at the edge server 104-1. The edge server 104-1 receives a query for "c.com". The edge server 104-1 forwards this DNS query to the origin server 106. The origin server 106, rather than simply responding with a negative response (which means "no record with the name c.com exists"), instead provides a second type of negative range response (NRR) listing the record names on either side of 'c.com' which do exist, based on an ordered listing of records in the zone. That is to say, the origin server 106 provides a response which says: "There is a record at 'b.com' and another at 'e.com', but nothing in between."

With continued reference to FIG. 4, at 406, the edge server 104-1 may transmit the response to the client device 102-1. At 408, the edge server 104-1 receives a second DNS query from the client device 102-1 requesting a second DNS record. The second DNS query is the same as the first DNS query. The edge server 104-1 determines that the second DNS record is not stored on the edge server 104-1. At 410, the edge server 104-1 generates a new response to the second DNS query based on the response from the origin server 106 obtained at 404. In one example, the second DNS query is not forwarded to the origin server 106. In this manner, the edge server 104-1 may be configured to respond to DNS queries without having to forward those queries to the origin server 106.

Figure 5:
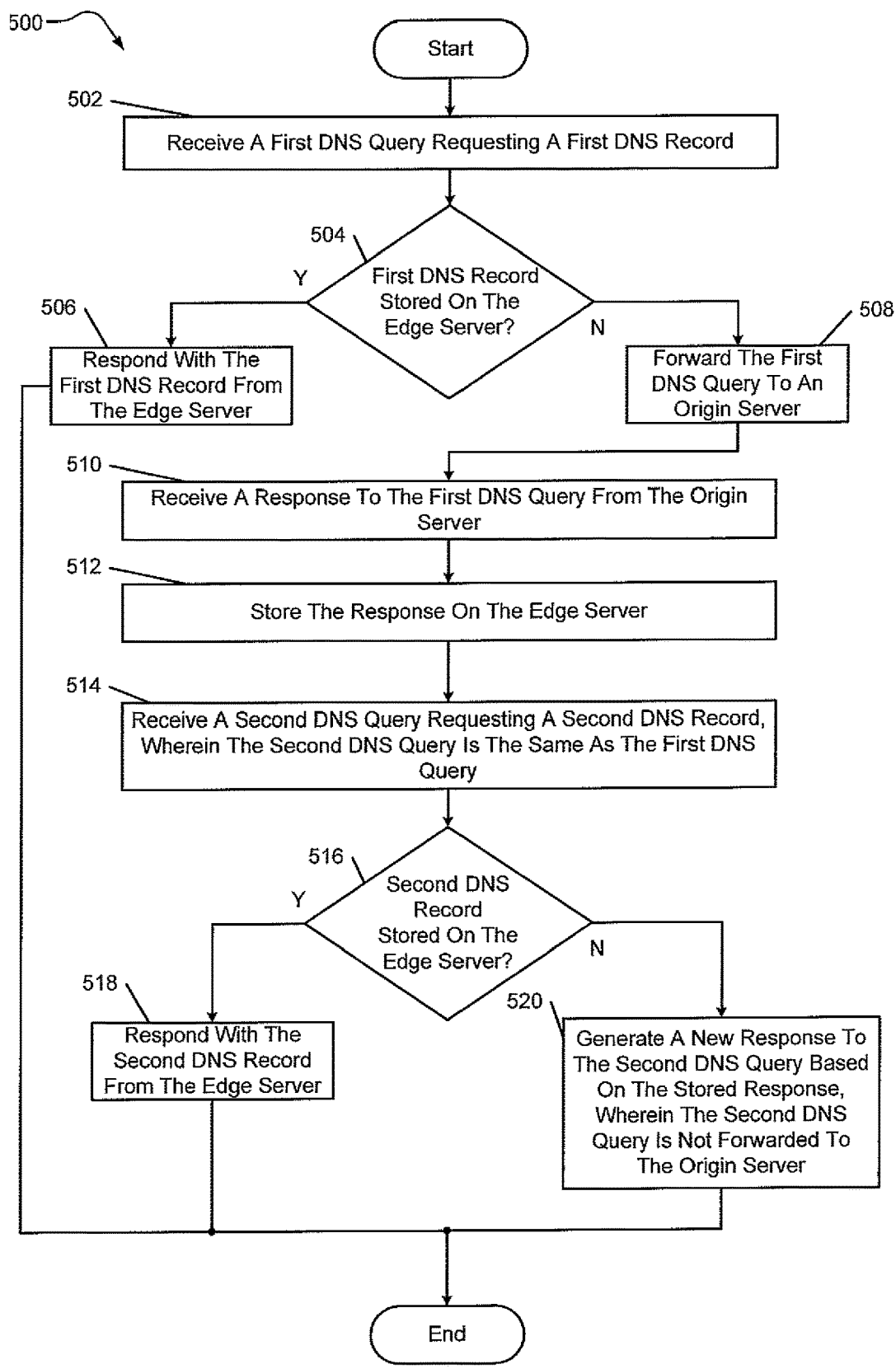
FIG. 5 is a flow diagram illustrating a method of responding to DNS queries from an edge server according to principles of the present disclosure.

Turning now to FIG. 5, a flow diagram illustrating a method 500 of responding to DNS queries from an edge server according to principles of the present disclosure is provided. The method 500 begins at 502 where a first DNS query requesting a first DNS record is received by the edge server. At 504, a determination is made as to whether the first DNS record is stored on the edge server. If so, the method 500 may proceed to 506 and the edge server may respond to the first DNS query with the first DNS record, and then conclude. However, if the first DNS record is not stored on the edge server, the method 500 may proceed to 508 and the first DNS query may be forwarded to an origin server. At 510, the edge server may receive a response to the first DNS query generated by the origin server. At 512, the edge server may store the response (e.g., in its cache) to provide a stored response. At 514, the edge server may receive a second DNS query requesting a second DNS record. The second DNS query may be the same as the first DNS query. At 516, a determination is made as to whether the second DNS record is stored on the edge server. If so, the method 500 may proceed to 518 and the edge server may respond with the second DNS record, and then conclude. However, if the second DNS record is not stored on the edge server, the method 500 may proceed to 520 and a new response may be generated by the edge server based on the stored response. The second DNS query is not forwarded to the origin server in this example. Following 520, the method 500 concludes.

Furthermore, and as discussed above, the nature of the response(s) sent from the edge server to the entity issuing the DNS query (e.g., a client device) may be dependent on the nature of the DNS query.

For example, where the first DNS query identifies the first DNS record by a record name and a record type, the response to the first DNS query from the origin server may include a 'no data' response indicating that the origin server has stored thereon one or more DNS records matching the record name specified in the first DNS query, but no DNS records matching both the record name and record type. In one example where the first DNS query identifies the first DNS record by a record name and a record type, the new response to the second DNS query may include a 'no data' response.

In another example, where the first DNS query identifies the first DNS record by a DNS zone and a record name, the response to the first DNS query from the origin server may include the second type of negative range response discussed above indicating (i) that the origin server hosts the DNS zone and (ii) a range of DNS record names, encompassing the record name, corresponding to DNS records that are not stored on the origin server.

In one example, where the first DNS query identifies the first DNS record by a DNS zone and a record name, the new response to the second DNS query may include a NXDO-MAIN response based on the second type of negative range response. More specifically, in this example, the edge server may be configured to determine that the record name specified in the second DNS query corresponds to a record name within a range covered by the second type of negative range response stored on the edge server. Accordingly, the edge server knows that the record name specified in the second DNS query is not stored on the origin server or the edge server. In such a scenario, the edge server may generate a NXDOMAIN response to the second DNS query without having to forward the second DNS query along to the origin server.

In another example, where the first DNS query identifies the first DNS record by a DNS zone, the response to the first DNS query from the origin server may include a first type of negative range response indicating a range of DNS zones, encompassing the DNS zone specified in the first DNS query, corresponding to DNS records that are not hosted by the origin server.

In one example, where the first DNS query identifies the first DNS record by a DNS zone, the new response to the second DNS query may include a REFUSED response based on the first type of negative range response. More specifically, in this example, the edge server may be configured to determine that the DNS zone specified in the second DNS query (and, consequently, any records within that DNS zone) is/are not hosted by the origin server or the edge server based on the first type of negative range response.

In one example, where the first DNS query matches a wildcard record stored on the origin server, the response to the first DNS query from the origin server may include the wildcard record. Similarly, where the first DNS query matches a wildcard record stored on the origin server, the new response to the second DNS query may be based on the wildcard record.

Figure 6:
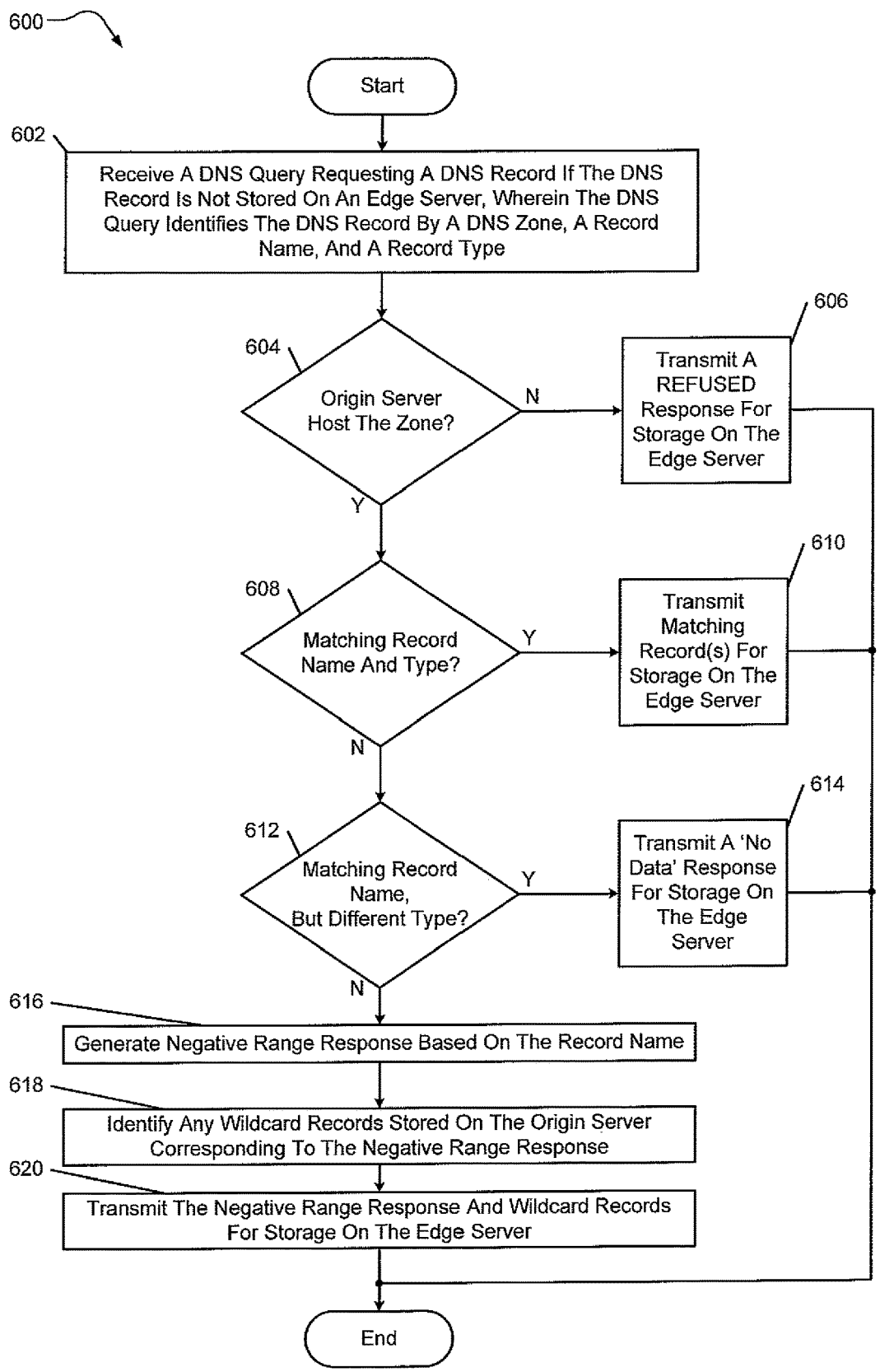
FIG. 6 is a flow diagram illustrating a method of responding to DNS queries from an origin server according to principles of the present disclosure.

Referring now to FIG. 6, a flow diagram illustrating a method 600 of responding to DNS queries from an origin server according to principles of the present disclosure is provided. The method 600 begins at 602 where a DNS query is received by the origin server requesting a DNS record if the DNS record is not stored on an edge server. The DNS query identifies the DNS record by a DNS zone, a record name, and a record type.

At 604, a determination is made as to whether the origin server hosts the DNS zone specified in the DNS query. If not, the method 600 proceeds to 606 where the origin server transmits a REFUSED response to the edge server for storage on the edge server, and then concludes. If the origin server does host the DNS zone specified in the DNS query, the method 600 proceeds to 608.

At 608, a determination is made as to whether the origin server has stored thereon one or more DNS records matching the record name and record type. If so, the method 600 proceeds to 610 where the one or more DNS records matching the record name and record type are transmitted to the edge server for storage thereon, and then concludes. If the origin server does not have any DNS records stored thereon matching the record name and record type, the method proceeds to 612.

At 612, a determination is made as to whether the origin server has stored thereon one or more DNS records matching the record name, but not the record type. If so, the method 600 proceeds to 614 where a 'no data' response is transmitted to the edge server for storage thereon, and then concludes. If the origin server does not have any DNS records stored thereon matching the record name, but not the record type, the method proceeds to 616.

At 616, a negative range response (e.g., the second type of negative range response, or $NRR_{NX}$) is generated based on the record name. The negative range response may indicate a range of DNS record name, encompassing the record name, corresponding to DNS records that are not stored on the origin server.

At 618, any wildcard records stored on the origin server corresponding to the negative range response are identified. In one example, the wildcard records may be identified according to the following principles.

A few basic tenets apply to the following discussion concerning techniques for identifying wildcard records: (1) because the $NRR_{NX}$ is independent of record type, the wildcards returned with the $NRR_{NX}$ must span all record types, not only the record type of the DNS query and (2) additional data (e.g. SOA, glue records etc.) may be required as part of each response from the origin server, since this additional data may be required by the edge server.

To ensure the simultaneous presence of both $NRR_{NX}$ and corresponding wildcards in the edge server cache, the origin server must return all corresponding wildcard records whenever it returns an $NRR_{NX}$.

At 620, the negative range response and any identified wildcard records are transmitted from the origin server to the edge server for storage on the edge server. Following 620, the method 600 concludes.

Figure 7:
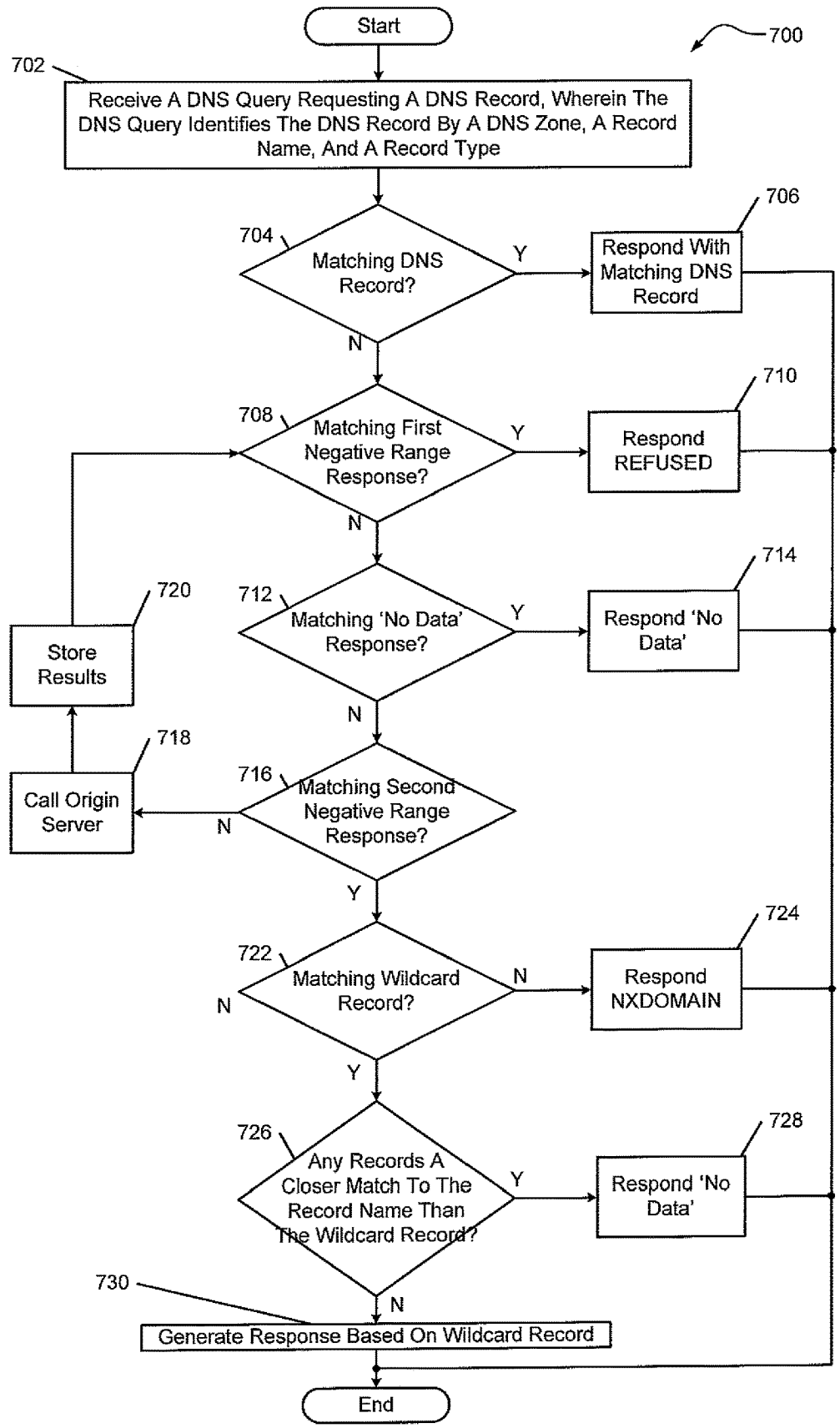
FIG. 7 is a flow diagram illustrating a method of responding to DNS queries from an edge server according to principles of the present disclosure.

Referring now to FIG. 7, a flow diagram illustrating a method 700 of responding to DNS queries from an edge server according to principles of the present disclosure is provided. The method 700 begins at 702 where a DNS query is received requesting a DNS record. The DNS query may identify the DNS record by a DNS zone, a record name, and a record type.

At 704, a determination is made as to whether the edge server has stored thereon a matching DNS record (i.e., a DNS record matching the DNS zone, record name, and record type specified in the DNS query). If so, the method 700 proceeds to 706 where the edge server responds to the DNS query with the matching DNS record, and then concludes. If the edge server does not have stored thereon a matching DNS record, the method 700 proceeds to 708.

At 708, a determination is made as to whether the DNS record specified in the DNS query corresponds to a first negative range response (e.g., a first type of negative range response, or $NRR_{RF}$) stored on the edge server based on the DNS zone specified as part of the DNS query. The first negative range response may indicate a range of DNS zones that are not hosted by an origin server associated with the edge server. If the DNS record specified in the DNS query corresponds to a first negative range response stored on the edge server, the method 700 proceeds to 710 where the edge server generates a REFUSED response for transmission to the requesting entity (e.g., a client device), and then concludes. If the DNS record specified in the DNS query does not correspond to a first negative range response stored on the edge server, the method 700 proceeds to 712.

At 712, a determination is made as to whether the DNS record specified in the DNS query corresponds to a 'no data' response stored on the edge server based on the record name and record type. The 'no data' response may indicate that the origin server has stored thereon one or more DNS records matching the record name specified in the DNS query, but no DNS records matching both the record name and the record type specified in the DNS query. If the DNS record does correspond to a 'no data' response stored on the edge server, the method 700 proceeds to 714 where the edge server generates a 'no data' response for transmission to the requesting entity (e.g., a client device), and then concludes. If the DNS record does not correspond to a 'no data' response stored on the edge server, the method 700 proceeds to 716.

At 716, a determination is made as to whether the DNS record specified in the DNS query corresponds to a second negative range response (e.g., a second type of negative range response, or $NRR_{NX}$) stored on the edge server based on the record name specified as part of the DNS query. If the record name specified in the DNS query does not correspond to a second negative range response stored on the edge server, the method 700 proceeds to 718 where the edge server calls the origin server to see whether the origin server includes the requested DNS record and, at 720, stores any results provided by the origin server before the method returns to 708. If, however, the record name specified in the DNS query does correspond to a second negative range response stored on the edge server, the method 700 proceeds to 722.

At 722, a determination is made as to whether the DNS query matches a wildcard record stored on the edge server. If not, the method 700 proceeds to 724 where the edge server generates a NXDOMAIN response for transmission to the requesting entity (e.g., a client device), and then concludes. If the DNS query does match a wildcard record stored on the edge server, the method 700 proceeds to 726.

At 726, a determination is made as to whether any DNS records stored on the edge server constitute a closer match to the record name specified in the DNS query than the wildcard record. If so, the method 700 proceeds to 728 where the edge server generates a 'no data' response for transmission to the requesting entity (e.g., a client device), and then concludes. If no records stored on the edge server constitute a closer match to the record name specified in the DNS query than the wildcard record, the method proceeds to 730.

At 730, the edge server may generate a response to the DNS query based on the wildcard record. The response could include, but is not limited to, a REFUSED response, a 'no data' response, a NXDOMAIN response, etc. Following 730, the method 700 concludes.

One goal of the present disclosure is to respond to all DNS queries from the edge server cache. Consider a zone 'com' containing a single record, '*.com'. Random queries against this zone will always match the wildcard record. If only the wildcard was returned by the origin server, the edge server would never be able to use the cached wildcard since it would never have a $NRR_{NX}$ record in its cache to which the wildcard corresponds. Each origin server response matching a wildcard must therefore contain the $NRR_{NX}$ matching the query and all wildcards corresponding to the $NRR_{NX}$, as reflected in FIG. 6 and the accompanying discussion provided above (discussing the behavior of an origin server according to example implementations of the present disclosure).

In some example implementations, the systems and techniques set forth herein may address the following additional considerations as well.

One additional consideration is cache duration, i.e., how long certain information (e.g., DNS records, negative range responses, REFUSED responses, 'no data' responses, etc.) should be stored at a given edge server. In some examples, to maintain the conditions set forth with regard to step 618 of FIG. 6 (concerning wildcard identification), the cache duration for each wildcard must be at least as long as the cache duration of any $NRR_{NX}$ to which is corresponds. In one example, this may be achieved by using the same cache duration for all $NRR_{NX}$ and wildcard records, and refreshing this duration every time an $NRR_{NX}$ or wildcard is returned by the origin server.

For example: a given wildcard W returned with $NRR_{NX}$ [A, B] may also be returned with a subsequent $NRR_{NX}$ [C, D]. In this case, the cache duration of W should be reset to match that of [C, D]. Continuing to cache W after [A, B] has been purged does not cause an issue, what is important is that W is not purged whilst either [A, B] or [C, D] remain in the cache.

Another additional consideration relates to a situation in which DNS records are added or modified at a given origin server. For example, assume the DNS administrator creates a new DNS record set. This record set should be visible at the edge servers reasonably promptly, which means any corresponding $NRR_{NX}$ must be removed from the edge server cache. The following reflects two exemplary ways of achieving this goal: (1) via an active cache-purging mechanism, whereby the origin server informs the edge server of new or updated records and the edge server purges corresponding records or negative range responses from its cache or (2) via a relatively short edge server cache duration for negative range responses. For example, a 1-minute duration may provide a suitably quick propagation of new records while still providing a substantial reduction in origin server query volume under a DDoS attack.

As with cache duration, it may be acceptable to purge $NRR_{NX}$ while continuing to cache corresponding wildcards. However, wildcards should not be purged without also purging any corresponding $NRR_{NX}$.

Yet another additional consideration relates to the data structures and protocols used between an edge server and an origin server. The following reflects some examples of suitable protocols and data structures for implementing various example implementations disclosed herein: (1) use a custom protocol; (2) use the DNS protocol, pass negative range response and wildcard data using the 'Additional Data' section of a DNS response; (3) use the DNS protocol, pass negative range response and wildcard data using custom EDNSO extensions; and (4) use the DNS protocol, infer negative range response data from NSEC records. In some examples, a suitable protocol and data structure may include various combinations of example implementations (1)-(4) above.

Another additional consideration relates to Domain Name System Security Extensions (DNSSEC). DNSSEC is a suite of extensions that add security to the Domain Name System (DNS) protocol by enabling DNS responses to be validated. Specifically, DNSSEC provides origin authority, data integrity, and authenticated denial of existence.

Assume DNSSEC is supported in an origin server. This section discusses how DNSSEC can be supported in an edge server cache as part of a system whereby all queries may (eventually) be responded to from the edge server (e.g., in a simple, single edge server/ single origin server embodiment).

Most DNSSEC records (RRSIG, DS, DNSKEY) are simply DNS records. As with any other record, they can be cached and served from the edge server. No special considerations apply. This includes wildcard records. The exception to this is NSEC and NSEC3 records. The similarity between NSEC/NSEC3 and $NRR_{NX}$ makes it tempting to try to combine these, i.e., to use NSEC/NSEC3 records in lieu of $NRR_{NX}$. For NSEC, this may be possible, but for NSEC3 this is very difficult, since the hash-based sort order does not meet the definition of '<<' relied upon above.

Instead, in one example, the $NRR_{NX}$ mechanism may be retained independently of DNSSEC, so the edge server determines the appropriate DNS response using the methods described herein. Then, if an NSEC/NSEC3 record is required, it is located either from the edge server cache or from the origin as necessary and returned to the caller.

A possible optimization when using NSEC3 is to compute the hash of the query name at the edge server and pass the hash to the origin server in addition to the query name. This may save the origin server from having to re-compute the hash (which is by NSEC3 design a computationally-intensive process).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. An edge server comprising:
   a processor;
   memory; and
   a domain name system (DNS) edge application that is stored in the memory and executed by the processor and that is configured to:
      receive a first domain name system (DNS) query requesting a first DNS record;
      if the first DNS record is not stored on the edge server, forward the first DNS query to an origin server;
      receive a response to the first DNS query from the origin server;
      store the response on the edge server to provide a stored response, wherein the stored response indicates that the first DNS record is not stored on the origin server;
      receive, after receiving the response to the first DNS query, a second DNS query requesting a second DNS record, wherein the first DNS query and the second DNS query comprise the same DNS query;
      if the second DNS record is not stored on the edge server,
         retrieve the stored response from the edge server;
         generate a new response to the second DNS query based on the stored response; and
         provide the new response to the second DNS query.

2. The edge server of claim 1, wherein:
   the first DNS query identifies the first DNS record by a record name and a record type; and
   the response to the first DNS query from the origin server comprises a 'no data' response indicating that the origin server has stored thereon one or more DNS records matching the record name, but does not have stored thereon any DNS records matching both the record name and the record type.

3. The edge server of claim 2, wherein the new response to the second DNS query comprises the 'no data' response.

4. The edge server of claim 1, wherein:
   the first DNS query identifies the first DNS record by a DNS zone and a record name; and
   the response to the first DNS query from the origin server comprises a negative range response indicating (i) that the origin server hosts the DNS zone and (ii) a range of DNS record names, encompassing the record name, corresponding to DNS records that are not stored on the origin server.

5. The edge server of claim 4, wherein the new response to the second DNS query comprises a NXDOMAIN response based on the negative range response.

6. The edge server of claim 1, wherein:
   the first DNS query identifies the first DNS record by a DNS zone; and
   the response to the first DNS query from the origin server comprises a negative range response indicating a range of DNS zones, encompassing the DNS zone, corresponding to DNS records that are not hosted by the origin server.

7. The edge server of claim 6, wherein the new response to the second DNS query comprises a REFUSED response based on the negative range response.

8. The edge server of claim 1, wherein:
   the first DNS query matches a wildcard record stored on the origin server; and
   the response to the first DNS query from the origin server comprises the wildcard record.

9. The edge server of claim 8, wherein the new response to the second DNS query is based on the wildcard record.

10. A method comprising:
    receiving a domain name system (DNS) query requesting a DNS record if the DNS record is not stored on an edge server, wherein the DNS query identifies the DNS record by a DNS zone, a record name, and a record type;
    determining whether an origin server hosts the DNS zone;

determining whether the origin server has one or more DNS records stored thereon matching the record name;

determining whether the origin server has one or more DNS records stored thereon matching the record type;

if the origin server hosts the DNS zone, but does not have stored thereon one or more DNS records matching the record name or the record type, generating a negative range response based on the record name, wherein the origin server comprises an ordered listing of records, wherein the negative range response indicates that the origin server does not include any records between a first stored record name and a second stored record name in the ordered listing of records, and wherein the record name would be between the first stored record name and the second stored record name based on the ordered listing of records;

identifying any wildcard records stored on the origin server corresponding to the negative range response; and transmitting, for storage on the edge server, the negative range response and any wildcard records.

11. The method of claim 10, further comprising:

if the origin server does not host the DNS zone, transmitting, for storage on the edge server, a REFUSED response.

12. The method of claim 10, further comprising:

if the origin server has one or more DNS records stored thereon matching the record name and the record type, transmitting, for storage on the edge server, the one or more DNS records matching the record name and the record type.

13. The method of claim 10, further comprising:

if the origin server has one or more DNS records stored thereon matching the record name, but not matching the record type, transmitting, for storage on the edge server, a 'no data' response.

14. A system comprising:

a processor;

memory; and a domain name system (DNS) edge application that is stored in the memory and executed by the processor and that is configured to:

receive a domain name system (DNS) query requesting a DNS record, wherein the DNS query identifies the DNS record by a DNS zone, a record name, and a record type;

determine whether the DNS record corresponds to a first negative range response stored on an edge server based on the DNS zone, wherein an origin server comprises an ordered listing of DNS zones, wherein the first negative range response indicates that the origin server does not include any DNS zones between a first stored DNS zone and a second stored DNS zone in the ordered listing of DNS zones, and wherein the DNS zone would be between the first stored DNS zone and the second stored DNS zone based on the ordered listing of DNS zones;

determine whether the DNS record corresponds to a 'no data' response stored on the edge server based on the record name and the record type, wherein the 'no data' response indicates that the origin server has stored thereon one or more DNS records matching the record name, but does not have stored thereon any DNS records matching both the record name and the record type;

determine whether the DNS record corresponds to a second negative range response stored on the edge server based on the record name;

if the DNS record corresponds to the second negative range response, determining whether the DNS query matches a wildcard record stored on the edge server;

if the DNS query matches the wildcard record, determining whether any records stored on the edge server comprise a closer match to the record name than the wildcard record; and generating at least one of the following responses to the DNS query without forwarding the DNS query to the origin server: a REFUSED response, the 'no data' response, a NXDOMAIN response, and a response based on the wildcard record.

15. The system of claim 14, wherein the DNS edge application is further configured to generate the REFUSED response if the DNS record corresponds to the first negative range response.

16. The system of claim 14, wherein the DNS edge application is further configured to generate the 'no data' response if the DNS record corresponds to the 'no data' response stored on the edge server.

17. The system of claim 14, wherein the DNS edge application is further configured to generate the NXDOMAIN response if the DNS query does not match the wildcard record stored on the edge server.

18. The system of claim 14, wherein the DNS edge application is further configured to generate the 'no data' response if one or more records stored on the edge server comprise the closer match to the record name than the wildcard record.

19. The system of claim 14, wherein the DNS edge application is further configured to generate the response based on the wildcard record if no records stored on the edge server comprise the closer match to the record name than the wildcard record.

20. The system of claim 14, wherein the DNS edge application is further configured to receive a third negative range response from the origin server if the DNS record does not correspond to the second negative range response stored on the edge server.

* * * * *